(12) United States Patent
Wentink et al.

(10) Patent No.: US 8,879,984 B2
(45) Date of Patent: Nov. 4, 2014

(54) CONTACT VERIFICATION SIGNALING

(75) Inventors: Maarten Menzo Wentink, San Diego, CA (US); Santosh Paul Abraham, San Diego, CA (US); Stephen J. Shellhammer, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 13/370,235

(22) Filed: Feb. 9, 2012

(65) Prior Publication Data

US 2013/0040579 A1 Feb. 14, 2013

Related U.S. Application Data (60) Provisional application No. 61/441,533, filed on Feb. 10, 2011, provisional application No. 61/446,479, filed on Feb. 24, 2011.

(51) Int. Cl.
*H04B 7/24* (2006.01)
*H04W 16/14* (2009.01)
*H04W 48/14* (2009.01)

(52) U.S. Cl.
CPC .............. *H04W 16/14* (2013.01); *H04W 48/14* (2013.01)
USPC .............. 455/39; 455/62; 455/63.1; 370/252; 370/254

(58) Field of Classification Search
USPC ............... 455/39, 62, 63.1, 69; 370/252, 254, 370/278, 337, 442
See application file for complete search history.

(56) References Cited

U.S. PATENT DOCUMENTS

| 7,796,545 B2 | 9/2010 | Surineni et al. |
| 8,089,343 B2* | 1/2012 | Yamaguchi et al. ......... 340/5.72 |
| 2009/0268652 A1 | 10/2009 | Kneckt et al. |
| 2010/0173586 A1 | 7/2010 | McHenry et al. |
| 2010/0248632 A1 | 9/2010 | Bhushan |
| 2011/0051647 A1 | 3/2011 | Sampath et al. |

FOREIGN PATENT DOCUMENTS

WO WO2011062395 A2 5/2011

OTHER PUBLICATIONS

Anonymous: "Wireless LAN Medium Access Control (MAC) and Physical Layer (PHY) specifications. Amendment 2: TV White Spaces Operation", IEEE P802.11AF/D0.09, no. Part 11, Jan. 1, 2011, pp. 1-159, XP007918708; hereinafter "Anonymous".*
Anonymous: "Wireless LAN Medium Access Control (MAC) and Physical Layer (PHY) specifications. Amendment 2: TV White Spaces Operation", IEEE P802.11AF /D0.09, no. Part 11, Jan. 1, 2011, pp. 1-159, XP007918708.
International Search Report and Written Opinion—PCT/US2012/024749—ISA/EPO—Apr. 12, 2012.
Kim, et al. "IEEE 802.11-11/0150r2: Normative Text for Contact Verification Signal," [Online] 2011, 8 pages.
"Part 11: Wireless LAN Medium Access Control (MAC) and Physical Layer (PHY) specifications Amendment 3: 3650a 3700 MHz Operation in USA ; 11-07-2607-00-000y-tgy-redline-between-Draft—5.0 and 4 .0", IEEE Draft; IEEE-SA, Piscataway, NJ, USA, vol. 802.11y, Sep. 17, 2008, pp. 1-98, XP017646893, [retrieved on Sep. 17, 2008].

* cited by examiner

*Primary Examiner* — Tuan H Nguyen
(74) *Attorney, Agent, or Firm* — Dang M. Vo (57) ABSTRACT

Certain aspects of the present disclosure provide techniques and apparatus for verification signaling, for example, in wireless communications in a television white space (TVWS) network.

52 Claims, 9 Drawing Sheets

FCC Device Modes for TVWS

| Type | Subtype | Max EIRP | No. of Chan | DB Access | Geo Loc. | |
|---|---|---|---|---|---|---|
| Fixed | Fixed | 4 W | 48 | Yes | Yes | Must check availability of the channel at least once a day. Must cease immediately if channel is not available. |
| Mobile/ Portable | Mode 1 | 100 mW | 30 | No | No | Must obtain a list of available channels over the air from a fixed or Mode II device. Must verify availability of channel every <u>60 s</u>. Must stop using channel if the channel cannot be verified. |
| | Mode 2 | 100 mW | 30 | Yes | Yes | -- Needs to check the database at least once a day<br>-- Combines own geo location information with database information to determine available channels.<br>-- Access to database may be through any technology.<br>-- Needs to check location every 60 s<br>-- If location has changed by more than 100 m,<br>--- availability of channel at new location must be checked. |

CONTACT VERIFICATION SIGNALING

CROSS-REFERENCE TO RELATED APPLICATIONS

This application claims benefit of U.S. Provisional Patent Application Ser. Nos. 61/441,533, filed Feb. 10, 2011, and 61/446,479, filed Feb. 24, 2011, both of which are herein incorporated by reference.

BACKGROUND

1. Field

Certain aspects of the present disclosure generally relate to wireless communications and, more particularly, to verification signaling.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements demanded for wireless communications systems, different schemes are being developed. One scheme known as "white-fi" entails expanding Wi-Fi technology with the unused frequency spectrum in the television (TV) band (i.e., the TV white space). An Institute of Electrical and Electronics Engineers (IEEE) 802.11af task group has been created to define an amendment to the IEEE 802.11 standard for using the TV white space (TVWS). The IEEE 802.11 denotes a set of Wireless Local Area Network (WLAN) air interface standards developed by the IEEE 802.11 committee for short-range communications (e.g., tens of meters to a few hundred meters). However, by using the TVWS with frequencies below 1 GHz, IEEE 802.11af may offer greater propagation distances to be achieved, in addition to the increased bandwidth offered by the unused frequencies in the TV spectrum.

SUMMARY

Certain aspects of the present disclosure provide an apparatus for wireless communications. The apparatus generally includes a transmitter configured to transmit a request designed to prompt transmission of a verification signal indicating the apparatus is within reception range of an enabling device capable of enabling the apparatus for wireless communications and a receiver configured to receive a verification signal transmitted from the enabling device in response to the request.

Certain aspects of the present disclosure provide a method for wireless communications. The method generally includes transmitting a request designed to prompt transmission of a verification signal indicating an apparatus is within reception range of an enabling device capable of enabling the apparatus for wireless communications and receiving a verification signal transmitted from the enabling device in response to the request.

Certain aspects of the present disclosure provide an apparatus for wireless communications. The apparatus generally includes means for transmitting a request designed to prompt transmission of a verification signal indicating the apparatus is within reception range of an enabling device capable of enabling the apparatus for wireless communications and means for receiving a verification signal transmitted from the enabling device in response to the request.

Certain aspects of the present disclosure provide a station. The station generally includes at least one antenna, a transmitter configured to transmit, via the at least one antenna, a request designed to prompt transmission of a verification signal indicating the station is within reception range of an enabling device capable of enabling the station for wireless communications, and a receiver configured to receive a verification signal transmitted from the enabling device in response to the request.

Certain aspects of the present disclosure provide a computer program product comprising a computer-readable medium having instructions stored thereon. The instructions generally executable by one or more processors for transmitting a request designed to prompt transmission of a verification signal indicating an apparatus is within reception range of an enabling device capable of enabling the apparatus for wireless communications and receiving a verification signal transmitted from the enabling device in response to the request.

Certain aspects of the present disclosure provide an apparatus for wireless communications. The apparatus generally includes a receiver configured to receive a request designed to prompt transmission of a verification signal that validates a device transmitting the frame is within reception range of the apparatus which is capable of enabling the transmitting device for television related communication and a transmitter configured to transmit a verification signal to the device in response to the request.

Certain aspects of the present disclosure provide a method for wireless communications. The method generally includes receiving a request designed to prompt transmission of a verification signal that validates a device transmitting the frame is within reception range of an apparatus which is capable of enabling the transmitting device for television related communication and transmitting a verification signal to the device in response to the request.

Certain aspects of the present disclosure provide an apparatus for wireless communications. The apparatus generally includes means for receiving a request designed to prompt transmission of a verification signal that validates a device transmitting the frame is within reception range of the apparatus which is capable of enabling the transmitting device for television related communication and means for transmitting a verification signal to the device in response to the request.

Certain aspects of the present disclosure provide an access point. The apparatus generally includes at least on antenna, a receiver configured to receive, via the at least one antenna, a request designed to prompt transmission of a verification signal that validates a device transmitting the frame is within reception range of the access point which is capable of enabling the transmitting device for television related communication, and a transmitter configured to transmit a verification signal to the device in response to the request.

Certain aspects of the present disclosure provide a computer program product comprising a computer-readable medium having instructions stored thereon. The instructions generally executable by one or more processors for receiving a request designed to prompt transmission of a verification signal that validates a device transmitting the frame is within reception range of an apparatus which is capable of enabling the transmitting device for television related communication and transmitting a verification signal to the device in response to the request.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure provide techniques that allow a device to request a verification signal that may be required to enable wireless communications by the device in a restricted network (e.g., television white space). Thus, even if the device misses a periodically transmitted verification signal (e.g., if the device is powered down), the device may request the verification signal to enable (or continue) wireless communications.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Figure 1:
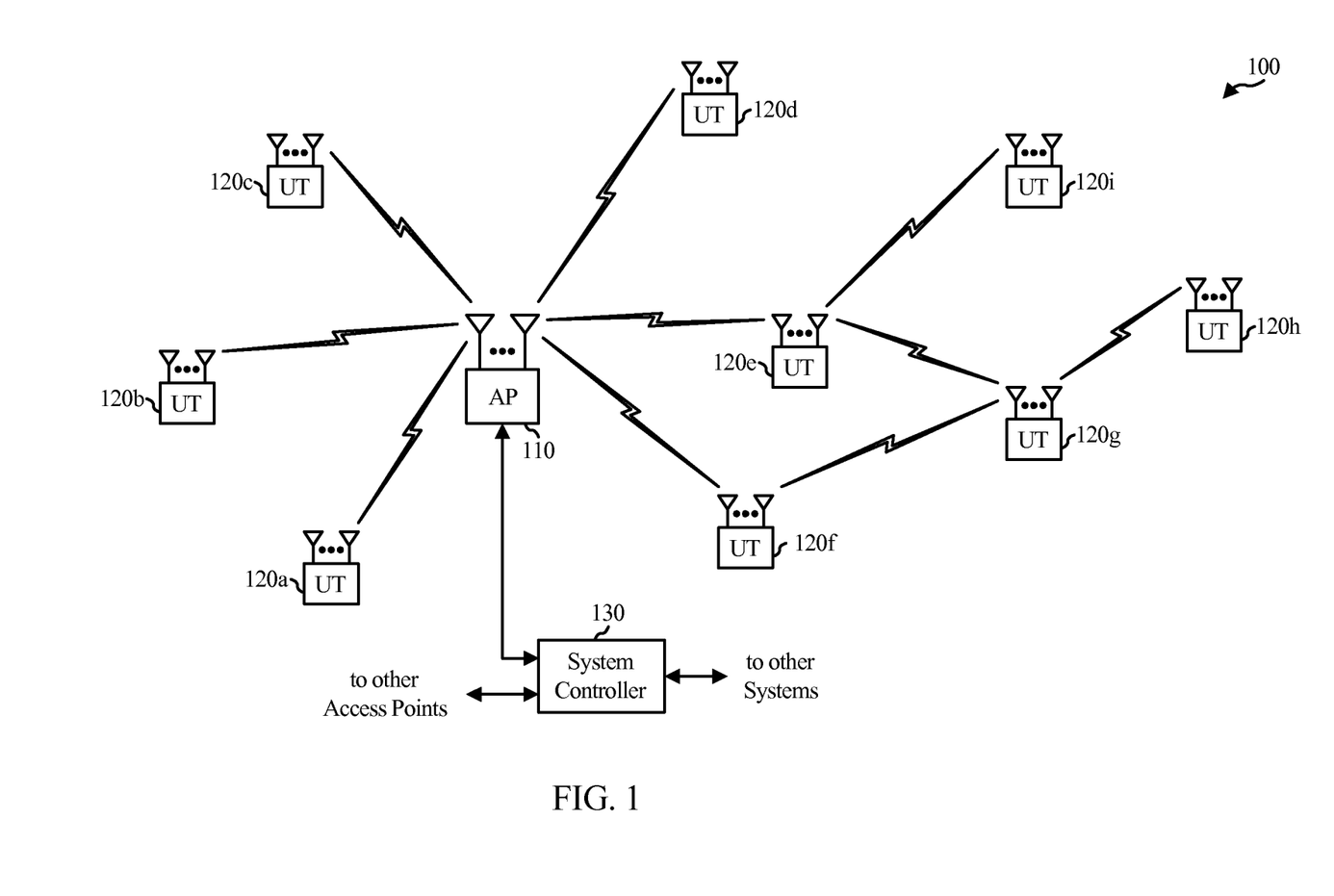
FIG. 1 illustrates a diagram of a wireless communications network in accordance with certain aspects of the present disclosure.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
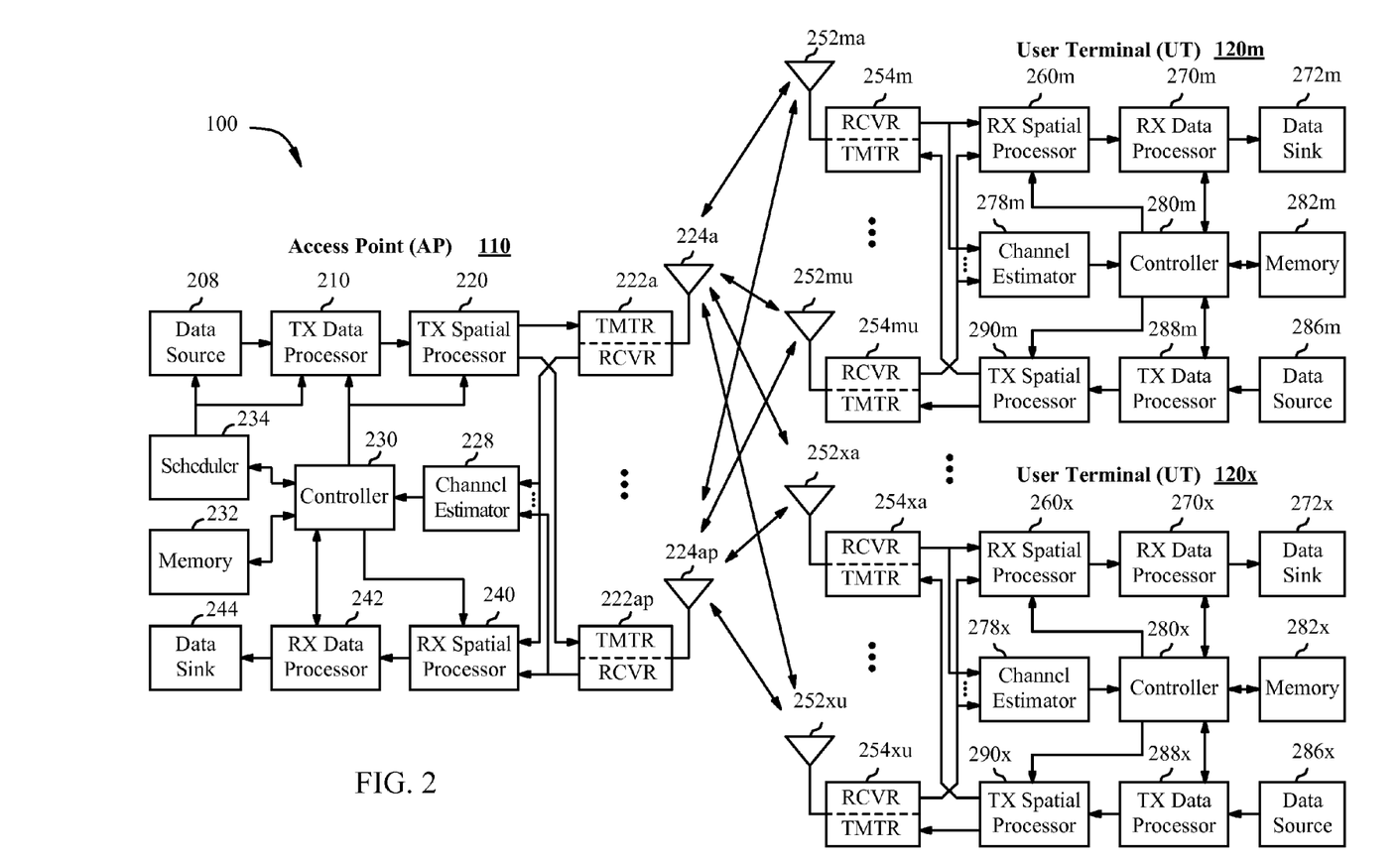
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
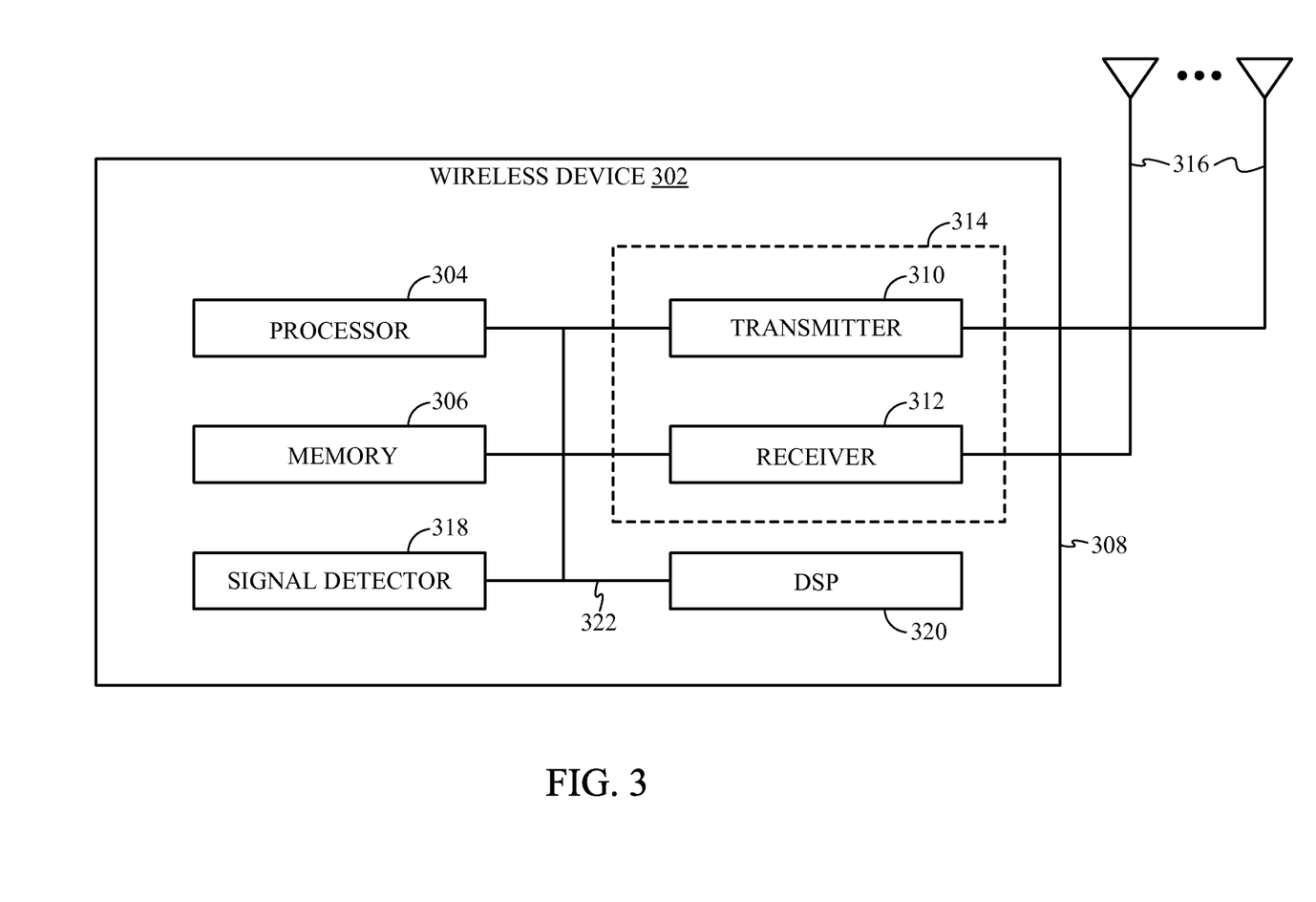
FIG. 3 illustrates a block diagram of an example wireless device in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Contact Verification Signaling 802.11af is an amendment to the 802.11 family standards that is designed to enable operation in the so called TV White Space (TVWS) Band. This amendment defines Mode 1 (or Mode I) devices that need to be enabled for operation in TVWS. Such enablement can be obtained from enabling devices, including so called Mode 2 (or Mode II) device or fixed devices.

Figure 4:
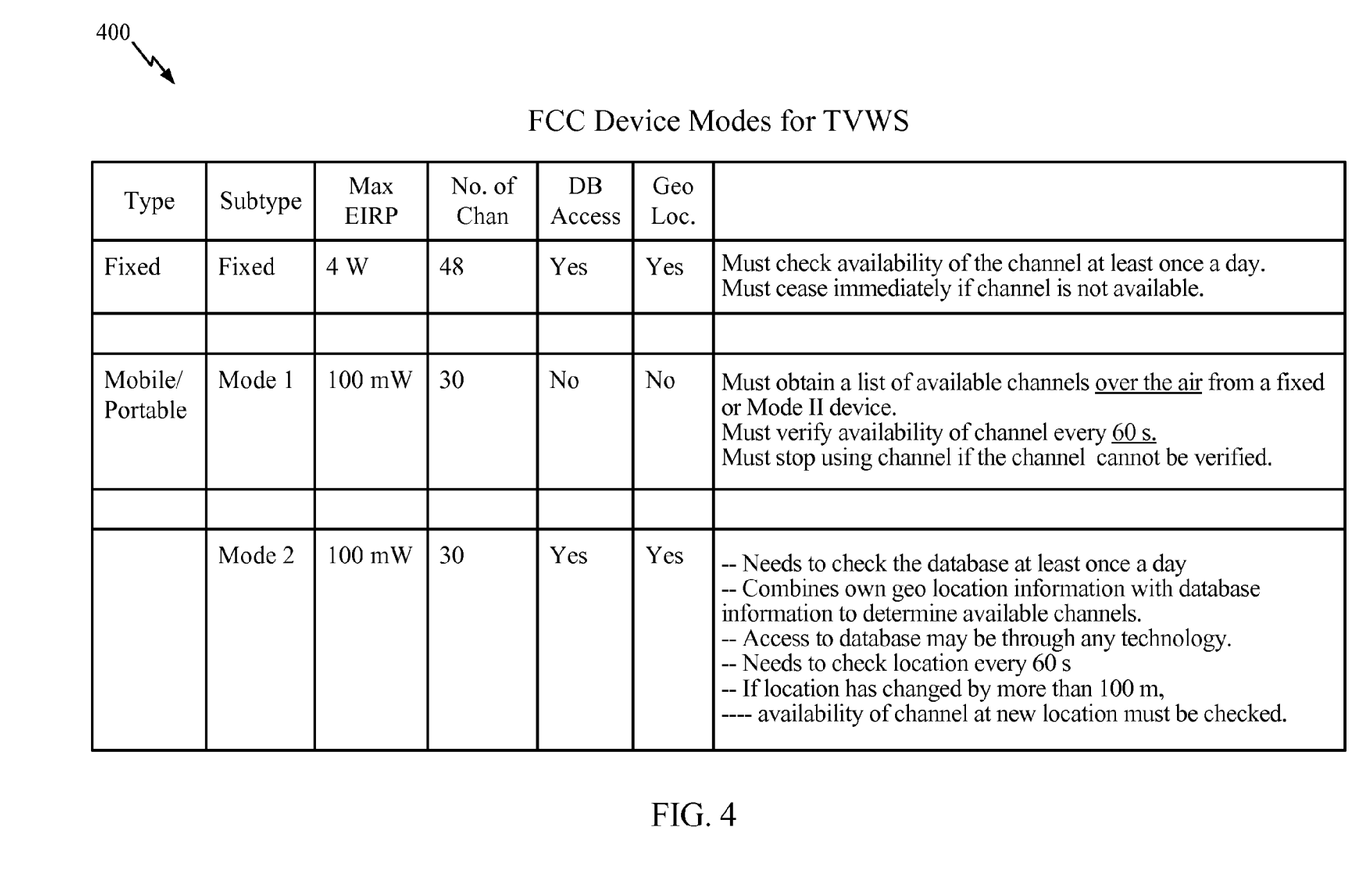
FIG. 4 illustrates a table of device modes for television white space (TVWS) as defined by the Federal Communications Commission (FCC), in accordance with certain aspects of the present disclosure.

FIG. 4 illustrates a table 400 of device modes for television white space (TVWS) as defined by the Federal Communications Commission (FCC). TVWS devices include fixed devices, which may most likely be installed by a professional and have the locations of the individual devices entered into a database. The maximum transmit power for fixed devices is 36 dBm. Mobile/portable TVWS devices include Mode 1 and Mode 2 devices, whose locations are not registered. The maximum transmit power for portable devices is 20 dBm. Fixed and Mode 2 devices are termed enabling stations (STAs), while a device in a Mode 1 operational state is termed a dependent STA.

Figure 5:
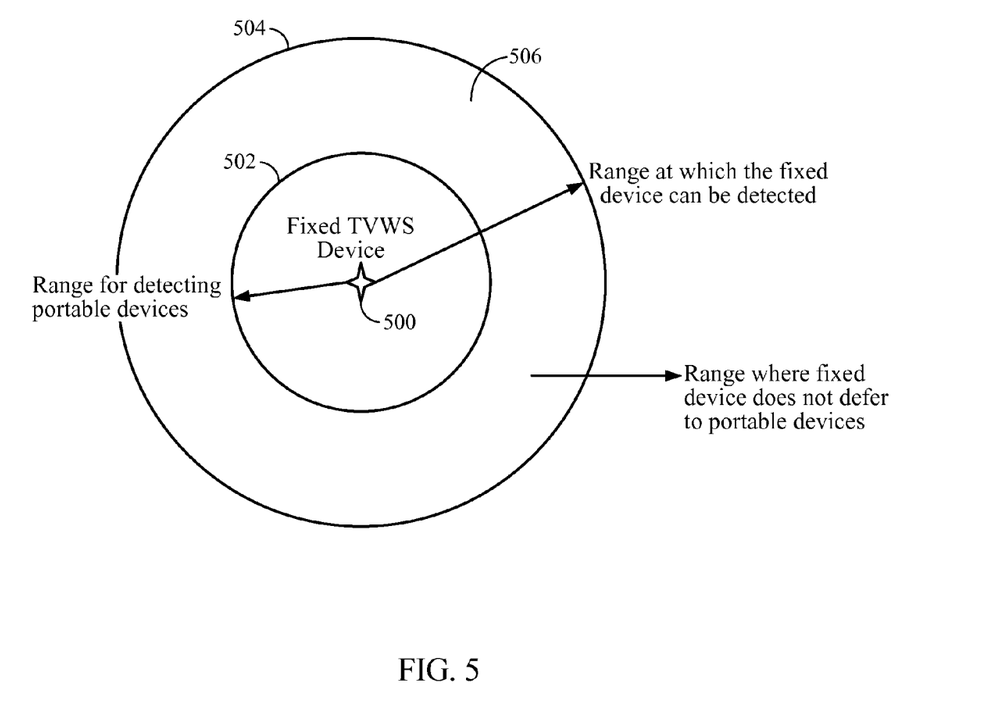
FIG. 5 illustrates different ranges at which a fixed device may be detected and may detect portable devices, in accordance with certain aspects of the present disclosure.

FIG. 5 illustrates a fixed TVWS device 500, such as an access point (AP) 110. The inner circle 502 represents a range at which the fixed device 500 can detect portable (Mode 1 or Mode 2) devices, whereas the outer circle 504 represents the range at which the fixed device 500 can be detected. The radius of the inner circle 502 is approximately half the radius of the outer circle 504. The area between the inner circle 502 and the outer circle 504 represents a region 506 where the fixed device 500 does not defer to portable devices.

To allow for co-existence of fixed and portable devices, portable devices may most likely use a channel that has a neighboring fixed device only if the fixed device is sufficiently close to hear the portable device. To determine interfering fixed devices, a report element the same as, or at least similar to, a transmit power control (TPC) report element in IEEE 802.11 may be used.

In a recent Order (10-174) the FCC requires that a Mode 1 device must provide its FCC Id before it is enabled and that a Mode 1I/fixed device provides 'list of available channels' only to those Mode 1 devices whose FCC Id is validated with database. This 2-way communication should use 'secure methods that ensure against corruption or unauthorized modification of the data.' According to the order, every 60 sec, a Mode 1 device must obtain over-the-air an encoded contact verification signal (CVS) that validates that Mode 1 device is within reception range of enabling (Mode 1I/fixed) device. The encoding may ensure the CVS is transmitted as a secure frame.

Thus, the CVS is a message that is conveyed to a Mode 1 station (STA) to verify that the AP is the enabling device. The AP may be a fixed or Mode 2 device. The CVS is required to maintain enablement in TVWS devices. According to current standards, a CVS must be received at intervals that do not exceed one minute. According to current standards, a CVS is a uni-cast Action frame that is sent to each Mode 1 device that has been enabled.

One problem with this current approach is that, in various scenarios, STAs may miss their CVS and, as a result, may lose their ability to communicate via TVWS, at least temporarily. For example, STAs that are in a low power state, such a sleep or idle state with at least receive circuitry powered down, cannot receive the CVS during the sleep time. As another example, a STA may not properly decode the transmitted unicast CVS due to errors in transmission and/or reception.

Certain aspects of the present disclosure, however, provide techniques that enable STAs (e.g., 802.11af STAs) to request and receive a verification signal (such as a CVS). The techniques presented herein may be used, for example, for a STA to send a request for a CVS after exiting a low power state in which receive capabilities are disabled or if they have missed the CVS for any other reason (e.g., a failure to properly decode).

According to certain aspects, a STA may send a request designed to prompt transmission of a CVS by an enabling device. For example, the STA may send an explicit CVS request frame, such as the CVS request frame 600 shown in FIG. 6. The CVS request frame 600 may include an information element (IE) that may include various fields. The fields may include, for example, an Info ID field 602 that indicates it is a request for CVS, a Length field 604 that Indicates number of bytes in the IE, and an Enablement Validity Time field 606 that indicates the amount of time that the current enablement is valid for.

Figure 6:
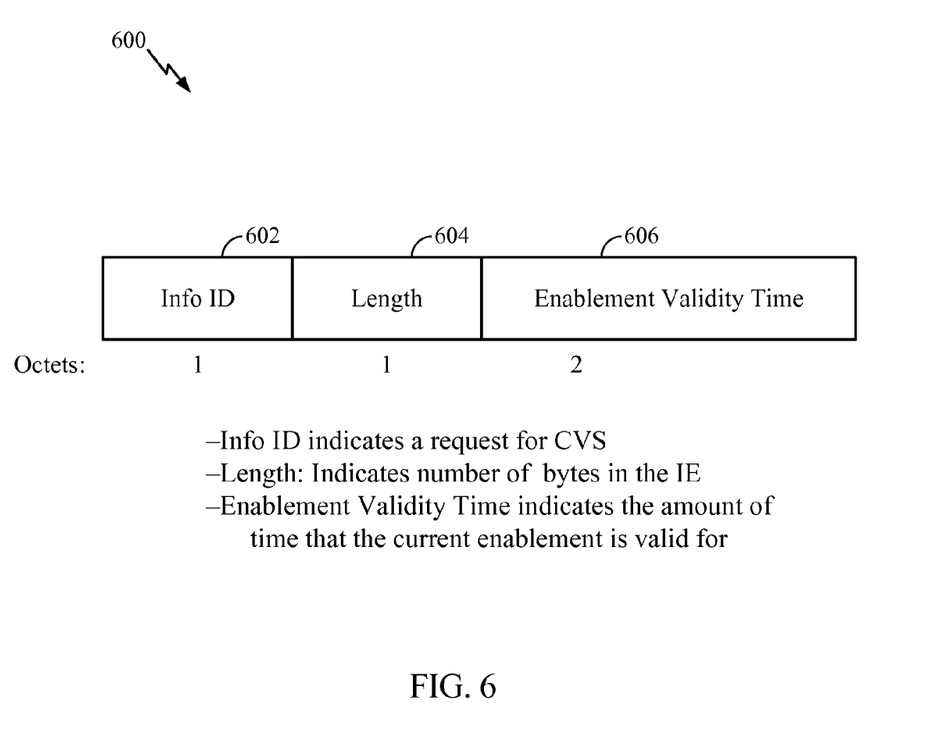
FIG. 6 illustrates an example verification signal request frame, in accordance with certain aspects of the present disclosure.

The Enablement Validity time field may be set, for example, to 60 seconds from the last CVS. The Enablement Validity time field may allow both the STA and AP to maintain a Response Timeout parameter indicating a time limit for receipt or transmission of the verification signal. The AP may use this time to determine when to send the requested CVS and/or a subsequent CVS. This may help conserve power, the STA may power down for and may enter a low power state (e.g., with receive circuitry disabled) for an amount of time indicated by the Enablement Validity time field, for example, since it determines the AP is not expected to send another CVS for that time.

For example, the STA may wake up when a time out period corresponding to the Enablement Validity time field is about to expire. The CVS request may be sent as a secure (or robust, encoded) management frame or as a robust action frame. In response to receiving the CVS request frame, the AP may respond with a secure unicast CVS frame. Request and/or CVS frames may be sent as secure frames by utilizing any technique designed to ensure against corruption or unauthorized modification of the data. For example, request and/or CVS frames may be encoded with encryption to secure the identity of the transmitting device.

FIG. 6 illustrates example operations 600 according to certain aspects of the technique for requesting a verification signal. The operations 600 may be performed, for example, by a Mode 1 device that has missed a CVS for some reason. The operations begin, at 602, by transmitting a frame designed to prompt transmission of a verification signal indicating the apparatus is within reception range of an enabling device capable of enabling television related communication. At 602, a verification signal transmitted from the enabling device in response to the transmitted frame.

Figure 7:
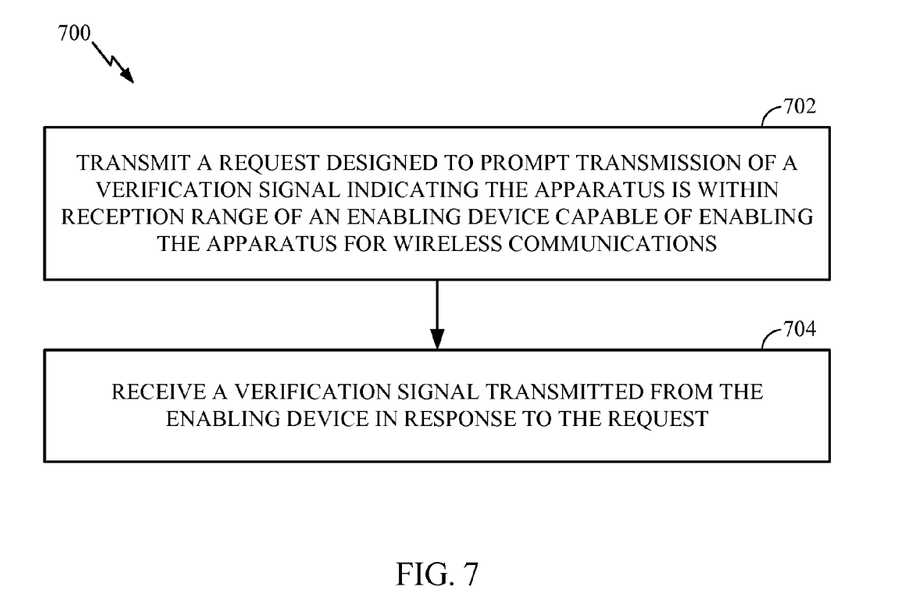
FIG. 7 illustrates example operations for requesting a verification signal, in accordance with certain aspects of the present disclosure.

FIG. 7 illustrates example operations 700 for signaling a verification signal, for example, by an enabling device (Fixed or Mode 2). The operations 700 begin, at 702, by receiving a frame designed to prompt transmission of a verification signal that validates a device transmitting the frame is within reception range of an apparatus which is capable of enabling the device for television related communication. At 704, a verification signal is transmitted to the device in response to the transmitted frame.

Figure 8:
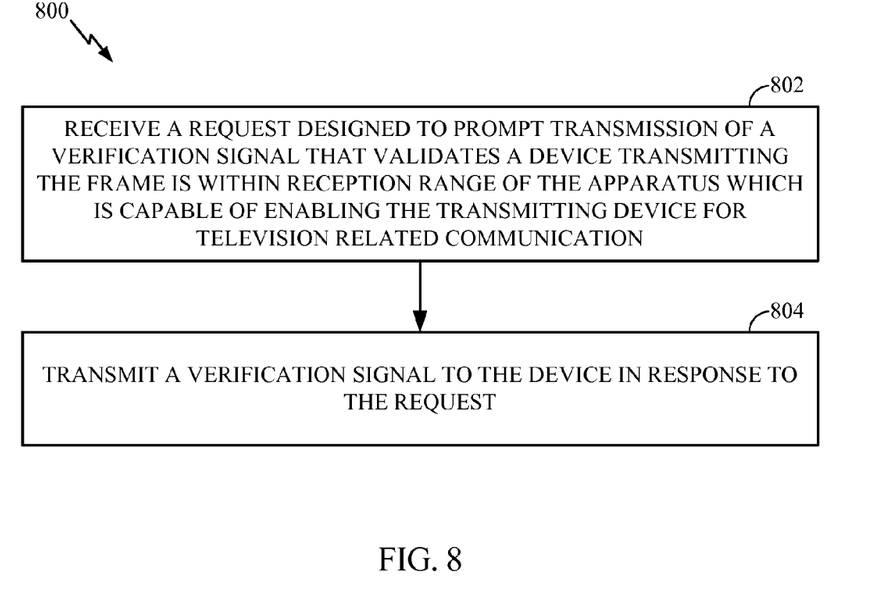
FIG. 8 illustrates example operations for verification signaling, in accordance with certain aspects of the present disclosure.
Figure 9:
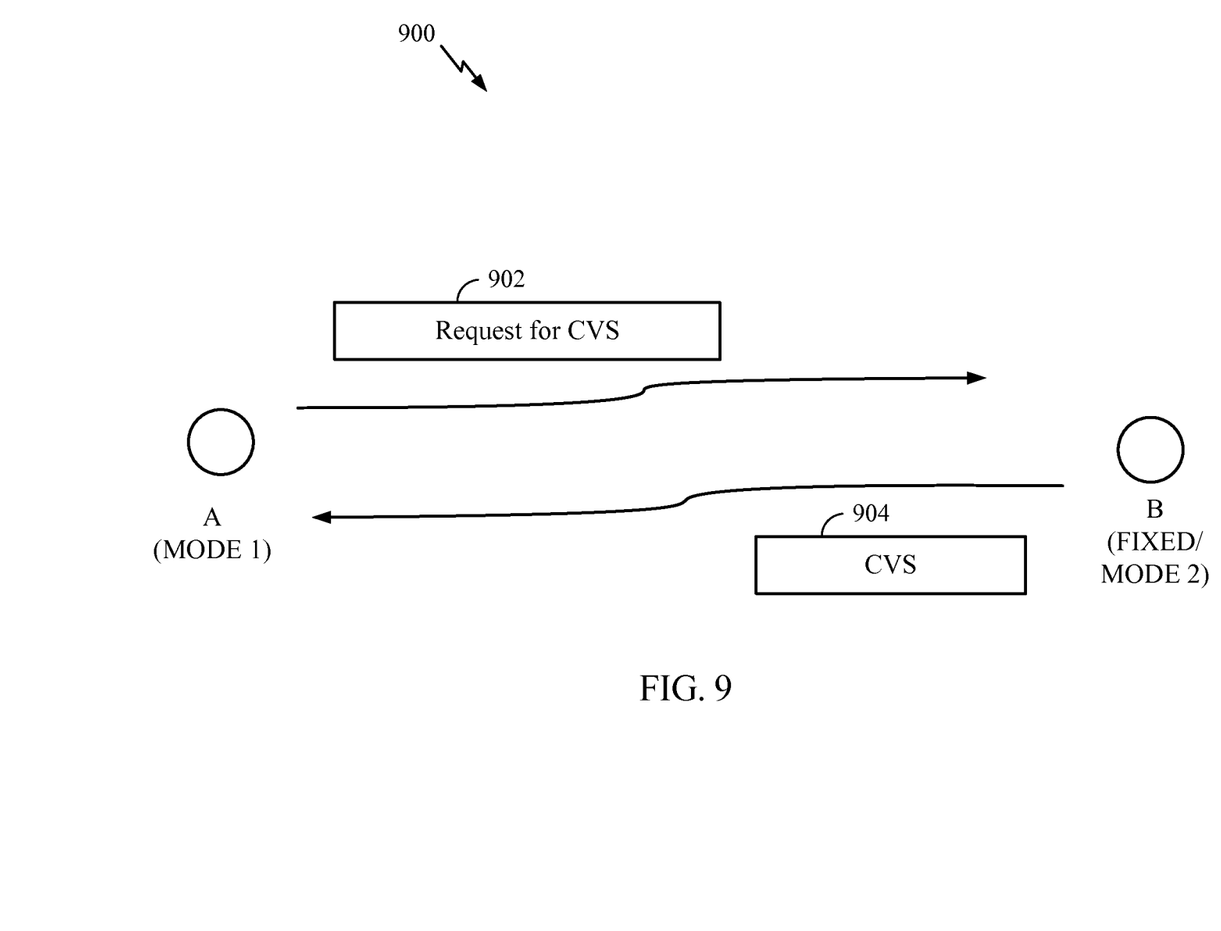
FIG. 9 illustrates an example exchange for verification signaling, in accordance with operations shown in FIGS. 7 and 8.

FIG. 9 illustrates an example exchange between a device, node A, needing a CVS for enablement and an enabling device, node B, in accordance with the operations shown in FIGS. 7 and 8. As illustrated, node A may send a request for CVS 902, for example, upon waking up from a sleep state. Node B may receive the request 902 and, in response, send a CVS 904. Node B may send the CVS 904 immediately or at least within a time determined based on an Enablement Validity Time field received in a request for CVS.

According to certain aspects, an access category (AC) of a CVS may be configured to be "delivery enabled" in order to be able trigger the recovery of the CVS when it wakes up from the sleep state. The AC may be set by the STA or the enabling device. Various types of AC may be designated for the CVS. For example, in STAs or networks that are not management frame QoS (MFQ) capable, the CVS frame may be designated with a highest priority access category (e.g., an AC that is a default for voice traffic AC_VO) since it is a management frame. In MFQ-capable STAs, the CVS may be assigned a suitable priority class preferably the AC_VO category.

By setting the AC of the CVS in this manner, an AP (enabling device) may buffer the CVS (prior to receiving a request for CVS) if the STA is in sleep state. When the STA wakes up from sleep state, it may send a frame designed to prompt the enabling device to send the CVS (e.g., this frame causes the enabling device the send the buffered CVS).

As an example, the STA may send a quality of Service (QoS) null frame or a QoS data frame (if data is available) with the class designated to the CVS, causing the enabling device to send the CVS.

Upon receiving the trigger, the AP (or other enabling device) may send the CVS to the STA. According to certain aspects, if there is data of the designated class of the CVS frame, the CVS may be sent as a first MAC protocol data unit (MPDU) of an aggregated MPDU (AMPDU) containing the data. Thus, if the AP receives access to transmit, the CVS may be aggregated with the other MPDUs of the class for which access is received.

According to certain aspects, a CVS request action frame may include a Category Field and an Action Field. The Category Field may be set to a value indicating Public. The Action Field may be set to a value indicating a CVS request (CVSR) frame. According to certain aspects, a management information base (MIB) parameter "CVSResponseTimeout" may be defined. This parameter may provide an indication of a time limit for the CVS to be sent from the enabling STA after receiving the CVS request. For example, once the enabling STA receives the CVS request, it may respond with a secure unicast CVS frame within the time limit indicated by the CVSResponseTimeout parameter.

While the present disclosure has referred to TVWS communications as a particular example of a type of wireless communications in which the techniques for verification signaling may be applied, those skilled in the art will appreciate that the techniques may be more broadly applied to various different other types of wireless communications.

Figure 7A:
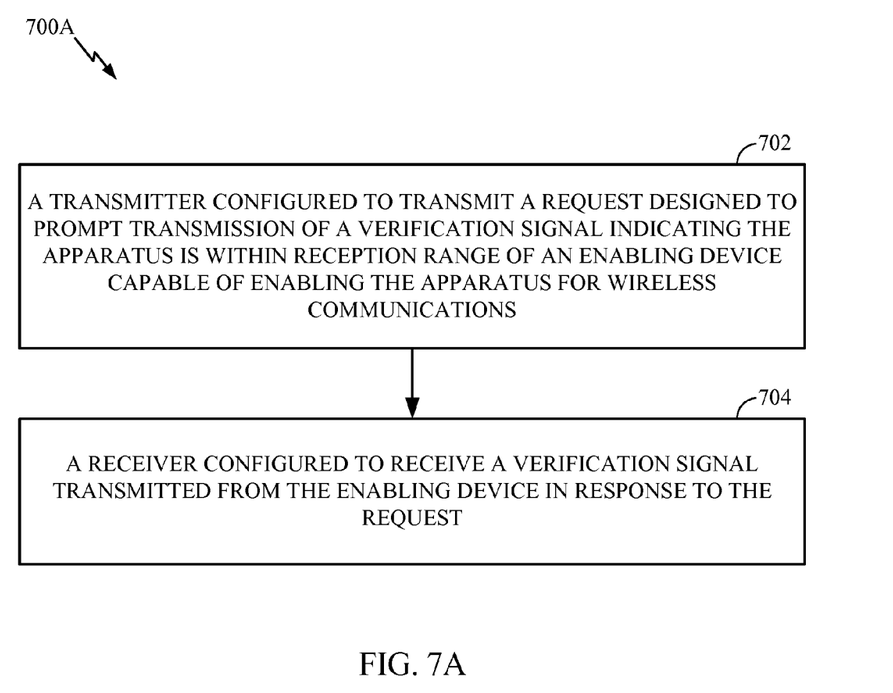
FIG. 7A illustrates example components capable of for performing the operations shown in FIG. 4.
Figure 8A:
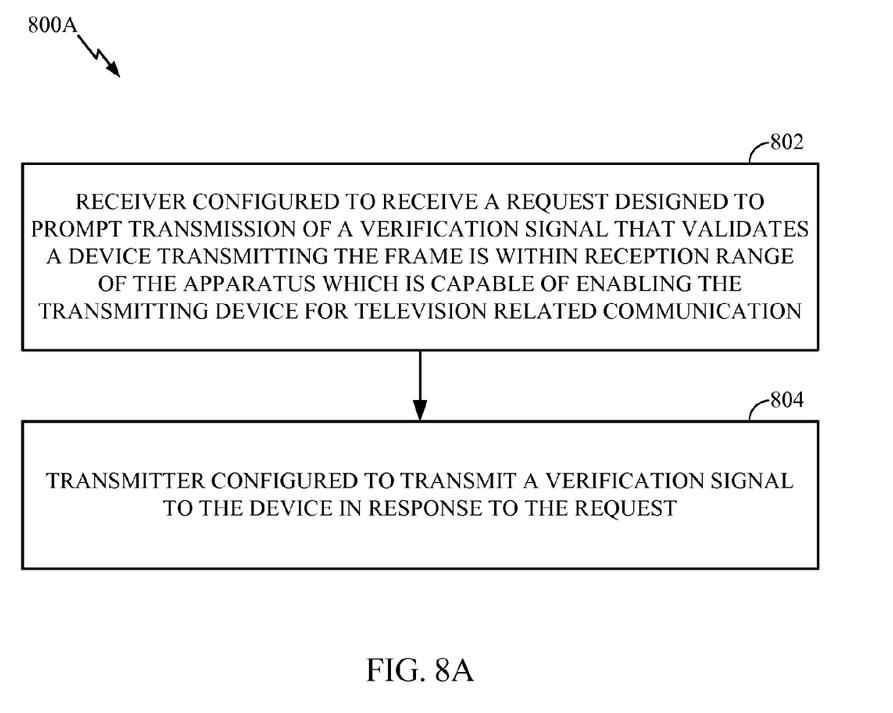
FIG. 8A illustrates example components capable of for performing the operations shown in FIG. 8.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in figures, those operations may have corresponding counterpart means-plus-function components with similar numbering. For example, operations 700 and 800 illustrated in FIGS. 7 and 8 correspond to means 700A and 800A illustrated in FIGS. 7A and 8A.

For example, a means for transmitting may comprise a transmitter, such as the transmitter unit 222 of the access point 110 illustrated in FIG. 2 or the transmitter unit 254 of the user terminal 120 depicted in FIG. 2. A means for receiving may comprise a receiver, such as the receiver unit 222 of the access point 110 or the receiver unit 254 of the user terminal 120 depicted in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
   a transmitter configured to transmit a request to an enabling device requesting transmission of a verification signal, the verification signal indicating the apparatus is within a reception range from which the enabling device is capable of enabling the apparatus for wireless communications; and
   a receiver configured to receive a transmitted verification signal from the enabling device in response to the request when the apparatus is within the reception range.

2. The apparatus of claim 1, wherein the verification signal comprises a contact verification signal (CVS).

3. The apparatus of claim 1, wherein the transmitter is configured to transmit the request after waking up from a low power state in which receive capability is disabled.

4. The apparatus of claim 3, wherein the transmitter is configured to wake up from the low power state in response to determining a time limit for receiving the verification signal is set to expire.

5. The apparatus of claim 1, wherein the request is transmitted as a request frame having an indication of an access category (AC) designated for the verification signal.

6. The apparatus of claim 5, wherein the request frame comprises a null frame with the AC designated for the verification signal, causing the enabling device to transmit the verification signal.

7. The apparatus of claim 5, wherein the receiver is configured to receive the transmitted verification signal in an aggregated data unit with other data of the AC designated for the verification signal.

8. The apparatus of claim 5, wherein the request frame comprises an information element (IE) indicating an amount of time for which a current enablement is valid.

9. The apparatus of claim 5, wherein:
the request frame is transmitted as a secure frame; and
the verification signal is received as a secure frame.

10. The apparatus of claim 5, wherein the AC for the request frame is a default AC for devices that are not management frame quality of service (QoS) capable.

11. The apparatus of claim 5, wherein the AC for the request frame is the AC designated for the verification signal.

12. The apparatus of claim 5, wherein the request frame comprises a category field set to a value indicating Public.

13. The apparatus of claim 5, wherein the request frame comprises an action field set to a value indicating a verification signal request frame.

14. The apparatus of claim 5, wherein:
the apparatus is configured with a Response Timeout parameter indicating a time limit for receiving the verification signal; and
the request frame is sent to ensure the transmitted verification signal is received within the time limit.

15. A method for wireless communications, comprising:
transmitting a request to an enabling device requesting transmission of a verification signal, the verification signal indicating an apparatus is within a reception range from which the enabling device is capable of enabling the apparatus for wireless communications; and
receiving a transmitted verification signal from the enabling device in response to the request when the apparatus is within the reception range.

16. The method of claim 15, wherein the verification signal comprises a contact verification signal (CVS).

17. The method of claim 15, wherein the transmitting comprises transmitting the request after waking up from a low power state in which receive capability is disabled.

18. The method of claim 15, further comprising waking up from the low power state in response to determining a time limit for receiving the verification signal is set to expire.

19. The method of claim 15, wherein the request is transmitted as a request frame having an indication of an access category (AC) designated for the verification signal.

20. The method of claim 19, wherein the request frame comprises a null frame with the AC designated for the verification signal, causing the enabling device to transmit the verification signal.

21. The method of claim 19, wherein the receiving comprises receiving the transmitted verification signal in an aggregated data unit with other data of the AC designated for the verification signal.

22. The method of claim 19, wherein the request frame comprises an information element (IE) indicating an amount of time for which a current enablement is valid.

23. The method of claim 19, wherein:
the request frame is sent as a secure frame; and
the verification signal is received as a secure frame.

24. The method of claim 19, wherein the AC for the request frame is a default AC for devices that are not management frame quality of service (QoS) capable.

25. The method of claim 19, wherein the AC for the request frame is the AC designated for the verification signal.

26. The method of claim 19, wherein the request frame comprises a category field set to a value indicating Public.

27. The method of claim 19, wherein the request frame comprises an action field set to a value indicating a verification signal request frame.

28. The method of claim 19, wherein:
the apparatus is configured with a Response Timeout parameter indicating a time limit for receiving the verification signal; and
the request frame is transmitted to ensure the transmitted verification signal is received within the time limit.

29. An apparatus for wireless communications, comprising:
means for transmitting, via at least one antenna, a request to an enabling device requesting transmission of a verification signal, the verification signal indicating the apparatus is within a reception range from which the enabling device is capable of enabling the apparatus for wireless communications; and
means for receiving a transmitted verification signal from the enabling device in response to the request when the apparatus is within the reception range.

30. A station, comprising:
at least one antenna;
a transmitter configured to transmit, via the at least one antenna, a request to an enabling device requesting transmission of a verification signal, the verification signal indicating the station is within a reception range from which the enabling device is capable of enabling the station for wireless communications; and
a receiver configured to receive a transmitted verification signal from the enabling device in response to the request when the station is within the reception range.

31. A program product comprising a non-transitory computer readable medium having instructions stored thereon, the instructions executable by an apparatus for:
transmitting a request to an enabling device requesting transmission of a verification signal, the verification signal indicating the apparatus is within a reception range from which the enabling device is capable of enabling the apparatus for wireless communications; and
receiving a transmitted verification signal from the enabling device in response to the request when the apparatus is within the reception range.

32. An apparatus for wireless communications, comprising:
a receiver configured to receive a request from a device requesting transmission of a verification signal, wherein the verification signal validates that the device is within a reception range from which the apparatus is capable of enabling the device for television related communication; and
a transmitter configured to transmit a requested verification signal to the device in response to the request when the device is within the reception range.

33. The apparatus of claim 32, wherein:
the apparatus is capable of enabling the device for wireless communications using television related bandwidth.

34. The apparatus of claim 32, wherein the apparatus is configured to buffer the verification signal prior to receiving the request.

35. The apparatus of claim 32, wherein:
the request was transmitted as a request frame with an indication of an access category (AC) designated for the verification signal; and
the transmitter is configured to transmit buffered data, including the requested verification signal, having the same AC designated for the verification signal, in response to receiving the request frame.

36. The apparatus of claim 35, wherein the request frame comprises a null frame with the AC designated for the verification signal, which causes the apparatus to transmit the buffered data, including the requested verification signal.

37. The apparatus of claim 35, wherein the request frame comprises a request for verification signal frame having an information element (IE) indicating an amount of time for which a current enablement is valid; and the apparatus determines when to send the requested verification signal based, at least in part, on the amount of time indicated in the IE.

38. The apparatus of claim 35, wherein:

the request frame is received as a secure frame; and the requested verification signal is transmitted as a secure frame.

39. The apparatus of claim 35, wherein an AC for the request frame is the AC designated for the verification signal, causing the apparatus to transmit the requested verification signal.

40. The apparatus of claim 32, wherein:

the apparatus is configured with a Response Timeout parameter indicating a time limit for receipt of the verification signal by the device; and the requested verification signal is transmitted to ensure the requested verification signal is received by the device within the time limit.

41. A method for wireless communications, comprising:

receiving, at an apparatus, a request from a device requesting transmission of a verification signal, wherein the verification signal validates that the device is within a reception range from which the apparatus is capable of enabling the device for television related communication; and transmitting a requested verification signal to the device in response to the request when the device is within the reception range.

42. The method of claim 41, wherein:

the apparatus is capable of enabling the device for wireless communications using television related bandwidth.

43. The method of claim 41, wherein the apparatus is configured to buffer the verification signal prior to receiving the request.

44. The method of claim 41, wherein:

the request was transmitted as a request frame with an indication of an access category (AC) designated for the verification signal; and the transmitting comprises transmitting buffered data, including the requested verification signal, having the same AC designated for the verification signal, in response to receiving the request frame.

45. The method of claim 44, wherein the request frame comprises a null frame with the AC designated for the requested verification signal, which causes the apparatus to transmit the buffered data, including the requested verification signal.

46. The method of claim 44, wherein:

the request frame comprises a request for verification signal frame having an information element (IE) indicating an amount of time for which a current enablement is valid; and the method further comprises determining when to send the requested verification signal based, at least in part, on the amount of time indicated in the IE.

47. The method of claim 44, wherein:

the request frame is received as a secure frame; and the requested verification signal is transmitted as a secure frame.

48. The method of claim 44, wherein an AC for the request frame is the AC designated for the verification signal, causing the apparatus to transmit the requested verification signal.

49. The method of claim 41, wherein:

the apparatus is configured with a Response Timeout parameter indicating a time limit for receipt of the verification signal by the device; and the requested verification signal is transmitted to ensure the requested verification signal is received by the device within the time limit.

50. An apparatus for wireless communications, comprising:

means for receiving, at an apparatus, a request from a device requesting transmission of a verification signal, wherein the verification signal validates that the device is within a reception range from which the apparatus is capable of enabling the device for television related communication; and means for transmitting a requested verification signal to the device in response to the request when the device is within the reception range.

51. A program product comprising a non-transitory computer readable medium having instructions stored thereon, the instructions executable by an apparatus:

receiving, at the apparatus, a request from a device requesting transmission of a verification signal, wherein the verification signal validates that the device is within a reception range from which the apparatus is capable of enabling the device for television related communication; and transmitting a requested verification signal to the device in response to the request when the device is within the reception range.

52. An access point, comprising:

at least one antenna;

a receiver configured to receive from a device, via the at least one antenna, a request requesting transmission of a verification signal, wherein the verification signal validates that the device is within a reception range from which the access point is capable of enabling the device for television related communication; and a transmitter configured to transmit a requested verification signal to the device in response to the request when the device is within the reception range.

* * * * *